(12) United States Patent
Margolin et al.

(10) Patent No.: US 12,554,540 B2
(45) Date of Patent: Feb. 17, 2026

(54) EVENT PROCESSING BY HARDWARE ACCELERATOR

(71) Applicant: Next Silicon Ltd, Givatayim (IL)

(72) Inventors: Alexander Margolin, Ashdod (IL); Menashe Daskal, Haifa (IL); Oren Nishry, Beit Lehem HaGlilit (IL)

(73) Assignee: Next Silicon Ltd, Givatayim (IL)

( * ) Notice: Subject to any disclaimer, the term of this patent is extended or adjusted under 35 U.S.C. 154(b) by 135 days.

(21) Appl. No.: 18/230,744

(22) Filed: Aug. 7, 2023

(65) Prior Publication Data

US 2025/0053449 A1    Feb. 13, 2025

(51) Int. Cl.
*G06F 9/50* (2006.01)
*G06F 9/48* (2006.01)
*G06F 9/54* (2006.01)

(52) U.S. Cl.
CPC ............ *G06F 9/5027* (2013.01); *G06F 9/542* (2013.01)

(58) Field of Classification Search
CPC .............................. G06F 9/5027; G06F 9/542
USPC .......................................................... 712/22
See application file for complete search history.

(56) References Cited

U.S. PATENT DOCUMENTS

| | | | |
|---|---|---|---|
| 2007/0198759 A1* | 8/2007 | Agarwal | G06F 13/26 710/260 |
| 2009/0216958 A1 | 8/2009 | Biles et al. | |
| 2012/0174098 A1* | 7/2012 | Tanikawa | G06F 9/4825 718/1 |
| 2015/0070368 A1 | 3/2015 | Wang et al. | |
| 2018/0006806 A1* | 1/2018 | Wang | G09C 1/00 |
| 2020/0409784 A1* | 12/2020 | Ould-Ahmed-Vall | G06F 9/30076 |
| 2021/0294641 A1* | 9/2021 | Kirubakaran | G06F 11/3024 |
| 2021/0373926 A1* | 12/2021 | Chen | G06F 9/5044 |
| 2021/0406091 A1* | 12/2021 | Thyagaturu | G06F 9/5088 |

OTHER PUBLICATIONS

European Search Report and the European Search Opinion Dated Jan. 2, 2025 From the European Patent Office Re. Application No. 24191145.2. (11 Pages).

* cited by examiner

*Primary Examiner* — Chun Kuan Lee

(57) ABSTRACT

A hardware acceleration circuit, comprising a communication interface for connecting to one or more event-driven circuits, a memory, an event handling circuit, and a hardware acceleration engine. The event handling circuit is adapted to detect one or more events triggered by one or more of the event-driven circuits, update one or more pointers pointing to one or more event handling routines stored in the memory and to a context memory segment in the memory storing a plurality of context parameters relating to the one or more events, and transmit the pointer(s) to the hardware acceleration engine. The hardware acceleration engine is adapted to receive the pointer(s) from the event handling circuit, and execute the event handling routine(s) pointed by the pointer(s) to process data relating to the event(s) according to at least some of the context parameters retrieved from the context memory segment using the pointer(s).

22 Claims, 4 Drawing Sheets

EVENT PROCESSING BY HARDWARE ACCELERATOR

BACKGROUND

The present invention, in some embodiments thereof, relates to handling events triggered by event-driven units, and, more specifically, but not exclusively, to handling events, triggered by event-driven units, by hardware accelerators deployed to process data relating to the triggered events.

In the current technological era, demand for increased computing power is constantly and rapidly growing. A lot of effort and resources are therefore invested in researching and developing more powerful, higher capacity and/or faster computing platforms, technologies, and/or architectures.

One such practice which is highly attractive and effective for application specific processing is hardware acceleration. Hardware accelerators utilizing function specific hardware adapted for specific computations and data processing, for example, network traffic management, data and video encoding and decoding, data encryption and decryption, and/or the like may significantly expedite data processing compared to software based processing executed by general-purpose processors.

SUMMARY

It is an object of the present invention to provide methods, systems and software program products for handling events by dedicated hardware accelerators with reduced and potentially no host processor intervention to increase processing performance, reduce latency and/or increase execution bandwidth. The foregoing and other objects are achieved by the features of the independent claims. Further implementation forms are apparent from the dependent claims, the description and the figures.

According to a first aspect of the present invention there is provided a hardware acceleration circuit, comprising, a communication interface for connecting to one or more event-driven circuits a memory an event handling circuit, and a hardware acceleration engine. The event handling circuit is adapted to detect one or more events triggered by one or more of the event-driven circuits, update one or more pointers pointing to one or more event handling routines stored in the memory and to a context memory segment in the memory storing a plurality of context parameters relating to the one or more events, and transmit the one or more pointers. The hardware acceleration engine is adapted to receive the one or more pointers from the event handling circuit, and execute the one or more event handling routines pointed by the one or more pointers to process data relating to the one or more events according to at least some of the plurality of context parameters retrieved from the context memory segment using the one or more pointers.

According to a second aspect of the present invention there is provided a method of accelerating event processing, comprising using a hardware acceleration circuit for detecting one or more events triggered by one or more event-driven circuits, updating one or more pointers pointing to one or more event handling routines stored in a memory, and to a context memory segment in the memory storing a plurality of context parameters relating to the one or more events, and executing the one or more event handling routines pointed by the one or more pointers to process data relating to the one or more events according to at least some of the plurality of context parameters retrieved from the context memory segment using the one or more pointers.

In a further implementation form of the first and/or second aspects, the hardware acceleration engine is adapted to process the one or more events with no intervention of a host processor.

In an optional implementation form of the first and/or second aspects, the event handling circuit is further adapted to allocate one or more hardware resources to support processing of the data relating to the one or more events.

In a further implementation form of the first and/or second aspects, one or more of the event handling routines are preloaded into the memory by one or more host processor.

In a further implementation form of the first and/or second aspects, one or more of the event handling routines are hard coded in the memory.

In a further implementation form of the first and/or second aspects, one or more of the plurality of context parameters is updated in the context memory segment by one or more of the event-driven circuits.

In a further implementation form of the first and/or second aspects, one or more of the plurality of context parameters is updated in the context memory segment by one or more host processors.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
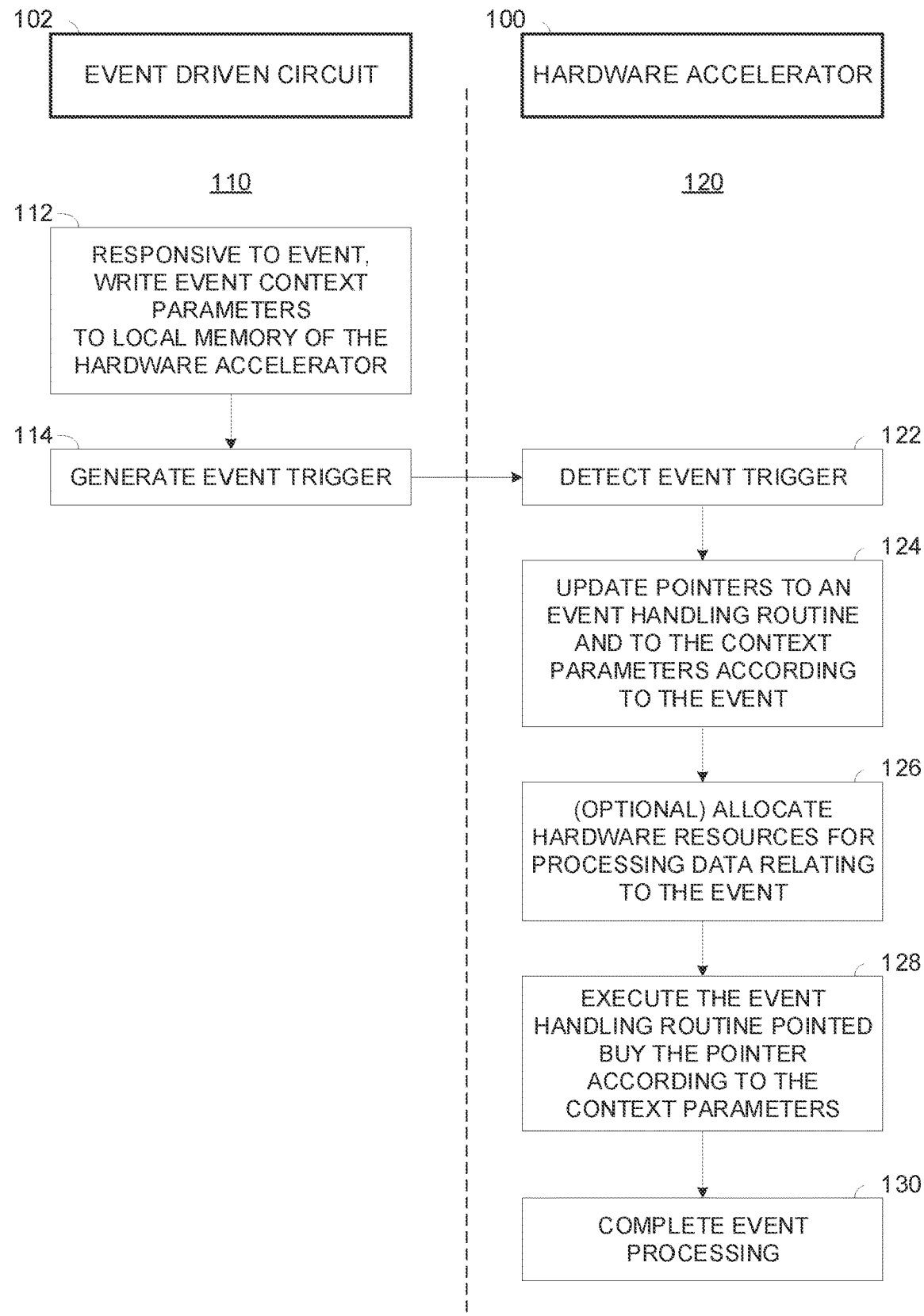
FIG. 1 is a flowchart of an exemplary process of handling events triggered by event-driven units by a hardware accelerator adapted to process data relating to the triggered events, according to some embodiments of the present invention.

The present invention, in some embodiments thereof, relates to handling events triggered by event-driven units, and, more specifically, but not exclusively, to handling events, triggered by event-driven units, by hardware accelerators deployed to process data relating to the triggered events.

As known in the art, hardware accelerators may be deployed to support general-purpose host processors in processing data relating to one or more applications, for example, network packets, data and video encoding/decoding, encryption, decryption, and/or the like. Such hardware accelerators may comprise hardware accelerating engines utilizing function specific hardware (elements) which may significantly expedite data processing compared to software based processing executed by the general-purpose host processors.

In many processing systems, environments, deployments and/or applications, the data that needs to be processed by the hardware accelerator relates to events triggered by one or more event-driven circuits (devices, components, units, modules, etc.). For example, the event-driven circuits may comprise one or more Network Interface Controllers (NIC) adapted to receive and/or transmit packets via one or more networks. In another example, the event-driven circuits may comprise one or more storage controllers adapted to fetch and/or store data blocks in one or more storage media devices (e.g., hard drive, etc.). In another example, the event-driven circuits may comprise one or more video controller adapted to receive imagery data captured by one or more imaging sensors (e.g., camera, RADAR, SONAR, etc.).

The events triggered by event-driven circuits may typically be asynchronous and independent of the execution flow of the host processor and may be reported to the host processor via one or more hardware and/or software mechanisms, for example, an interrupt, a notification, a message and/or the like.

Therefore, in order to handle an event triggered by an event-driven circuit, the host processor needs to perform a context switch in order to switch from a currently executed routine (thread) to execute an event handling routine comprising program instructions for handling the event. As known in the art, while the context for the event handling routine may be available to the host processor, one or more context parameters may be provided and/or retrieved from the respective event-driven circuit which triggered the event.

As part of the event handling routine invoked and executed in response to a triggered event, the host processor may handle the event and operate and/or control one or more hardware accelerators to process data relating to the triggered event. For example, the host processor may control transfer of data, which relates to the triggered event, to memory, typically a system memory accessible to the host processor and to the hardware accelerator, for example, by operating one or more Direct Memory Access (DMA) engines. In another example, the host processor may retrieve a plurality of context parameters relating to the triggered event.

The host processor may then control the hardware accelerator(s) to process the data relating to the event. For example, in response to an incoming network packet(s) event triggered by a NIC, the host processor may operate a network processing hardware accelerator adapted to process network packets. In another example, in response to loading an encoded data block from a hard drive by a storage controller, the host processor may operate a network processing hardware accelerator adapted to decode the encoded data.

According to some embodiments of the present invention, there are provided devices, methods and computer program products for handling events triggered by event-driven circuits by the hardware accelerator with significantly reduced and potentially no intervention of the host processor.

The hardware accelerator may comprise hardware resources for handling the triggered events themselves which are triggered by one or more of the event-driven circuits rather than just processing data relating to the events.

For example, the hardware accelerator may include an event handling circuit for handling events. The event handling circuit may be configured to detect one or more triggers activated by the event-driven circuit(s), for example, detect an asserted interrupt line, detect an access (read, and/or write) to a monitored memory location and/or register, and/or the like.

The hardware accelerator may further include a local memory, typically a high availability and high-speed dynamic and dedicated memory, either internal and/or external, which may be used to store, for example, event handling routines to be executed for handling respective events, context parameters relating to the events, and/or data relating to the events. One or more event handling routines and optionally one or more context parameters relating to one or more events may be loaded into the local memory in advance (offline), i.e., prior to triggering events, for example, during a boot sequence, initialization process, and/or the like.

Therefore, rather than transferring the context parameters and data relating to an event, the event-driven circuits may be configured to load the related context parameters and data to the local memory dedicated to the hardware accelerator.

In response to detecting an event, the event handling circuit may update one or more pointers according to the detected event which may point (map) a respective event handling routine associated with the respective event and a context memory segment storing the context parameters including data relating to the respective event.

The event handling circuit may transmit, transfer, and/or otherwise provide the updated pointer(s) to the hardware acceleration engine of the hardware accelerator which may use the pointer(s) to execute the respective event handling routine and access the data relating to the respective event which is mapped by the pointer(s) in the local memory. The hardware acceleration engine may process the data according to the context parameters relating to the respective event which are also mapped in the local memory by the pointer(s).

Optionally, the event handling circuit may further allocate hardware resources for use by the hardware acceleration engine to process the data relating to the event, for example, execution pipelines, computing cores, threads, function specific hardware units (e.g., multipliers, Fast Fourier Transform (FFT) units, convolution units, etc.), memory arrays (e.g., RAM, FIFO, etc.), queues, and/or the like. In particular, the hardware resources may be allocated to the hardware acceleration engine according to the processed event, for example, event type, computation intensity, criticality, latency, and/or the like.

Upon completion of processing the data relating to the triggered event, the hardware accelerator, for example, the event handling circuit may notify the host processor and/or the respective event-driven circuit accordingly that the respective event is done.

Accelerating event handling using a hardware accelerator adapted to handle the events themselves rather than just process data relating to the events may present major benefits and advantages compared to legacy and existing event handling methods and hardware.

First, since the hardware accelerator directly handles events triggered by the event-driven circuits, the host processor is relieved from this task which may eliminate the need for the processor to perform context switches to switch from its currently executed thread(s) to execute event handling routines. The reduced number context switches may significantly reduce execution overhead of the host processor thus significantly increasing performance of the host processor, for example, reduce processing time, reduce processing resources, increase execution bandwidth, and/or the like.

Moreover, the context (parameters) of each of the plurality of events may be loaded in respective context memory segments in the local memory of the hardware accelerator. When detecting an event trigger, the event handling circuit may select the one of the context memory segments according to the detected event and provide it to the hardware accretion engine. This may significantly reduce event handling latency since it eliminates the need for retrieving relevant context for each detected event, for example, by the host processor from some remote memory as may be done by the existing event handling methods.

Also, at least some of the context (parameters) relating to one or more events may be loaded in advance (offline) into receptive context memory segments thus further reducing event handling processing latency compared to existing event handling methods which may need to retrieve the context in real-time.

In addition, since the event-driven circuits transfer the event content, i.e., the data relating to the event, to the hardware accelerator's local memory rather than to the memory space of the host processor, for example, the system memory as may be done by the existing methods, the data may be immediately available to the hardware acceleration engine. Memory access latency of the hardware acceleration engine may be therefore significantly reduced thus significantly increasing data processing performance of the hardware accelerator.

Furthermore, since the event content is transferred from the event-driven circuits directly to the hardware accelerator's local memory rather than to the system memory, the event content (data) needs to be transferred only once over a system bus connecting the host processor, as well as the event-driven circuits and the hardware accelerator to the system memory. This is in contrast to the existing event handling methods in which the event data may be transferred twice, first from the event-driven circuits to the system memory and then from the system memory to the hardware accelerator. Transferring the event data only once may significantly reduce bus utilization of the system bus compared to existing event handling methods freeing the system bus for increased transfer bandwidth by other applications.

Finally, allocating resources of the hardware accelerator per event and according to the event may significantly improve utilization of the resources available to the hardware accelerator compared to employing a global predefined and/or given amount of resources for processing any event regardless of its type as may be done by the existing event handling methods. The resources of the hardware accelerator which may obviously be limited may be therefore efficiently allocated for processing each event thus improving resource utilization. Moreover, improving resource utilization may contribute to increasing the number of events that may be concurrently processed by the hardware accelerator.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to the drawings, FIG. 1 is a flowchart of an exemplary process of handling events triggered by event-driven units by a hardware accelerator adapted to process data relating to the triggered events, according to some embodiments of the present invention.

An exemplary process 120 may be executed by a hardware accelerator 102 to process data relating to one or more events triggered by one or more event-driven circuits (units) 102 each executing an exemplary process 110.

In particular, the hardware accelerator 100 deployed to support one or more host processors through hardware acceleration with reduced and potentially no intervention of the host processor(s) in the handling, managing, and/or processing of the events and/or their data relating to these events.

Figure 2:
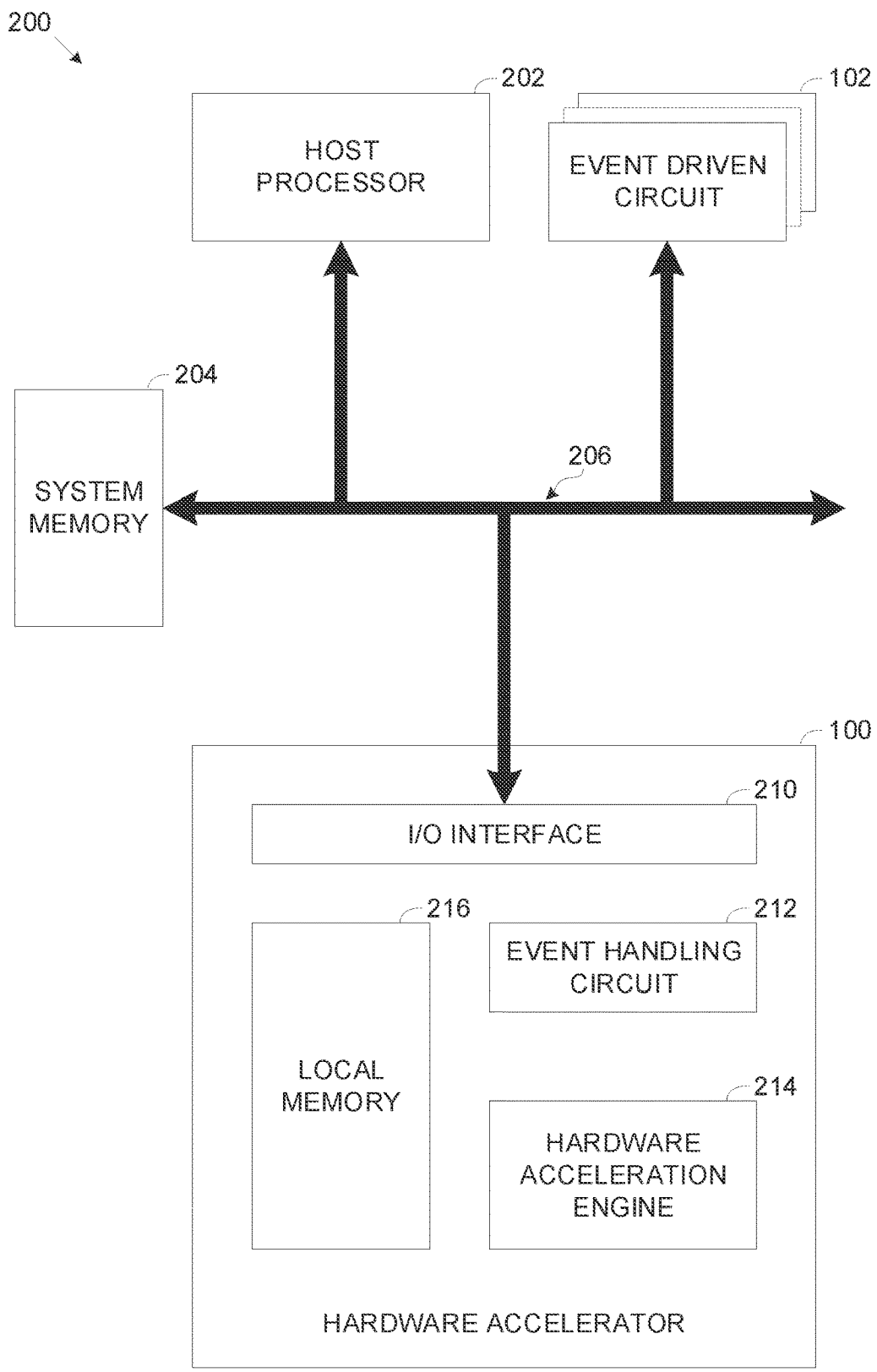
FIG. 2 is a schematic illustration of an exemplary hardware accelerator adapted to handle events triggered by event-driven units, according to some embodiments of the present invention.

Reference is also made to FIG. 2, which is a schematic illustration of an exemplary hardware accelerator adapted to handle events triggered by event-driven units, according to some embodiments of the present invention.

An exemplary hardware accelerator 100 may be deployed in an exemplary computing system 200 (circuit, component, device, system, apparatus, etc.) to support one or more processors, designated host processor 202 in execution of one or more tasks through hardware acceleration, typically data processing related tasks such as, for example, network packets processing, image processing, Digital Signal Processing (DSP), cryptography, Artificial Intelligence (AI), and/or the like.

As known in the art, the hardware accelerator 100 may comprise and/or utilize dedicated hardware circuits, modules, elements, and/or engines, designated hardware acceleration engine 214 hereinafter, which are specifically designed, configured and/or adapted for efficient execution of specific functions and/or tasks. Employing the hardware accelerator 100 to perform its specifically designated functionality may therefore significantly increase execution performance compared to software running on a general-purpose processor, for example, increase execution speed, reduce processing time, reduce latency, increase bandwidth, and/or the like.

One or more event-driven circuits 102, interchangeably designated event-driven units, may trigger events, typically relating to external resources, functions, and/or elements which are received independently from and asynchronously to the execution flow of the host processor 202 and handling these events may therefore interrupt the execution flow.

The hardware accelerator 100 may comprise an Input/Output (I/O) interface 210 for connecting to one or more interconnections, channels, busses, links, and/or the like deployed in the computing system 200 for electrically and communicatively coupling circuits, components, devices, and/or elements in the computing system 200.

The hardware accelerator 100 may further comprise an event handling circuit 212 adapted to detect and handle event triggers triggered by one or more event-driven circuits 102.

The hardware accelerator 100 may also include local memory 216, typically a high-speed memory which is immediately available to the hardware accelerator 100. The local memory 216 may comprise one or more memory arrays which may be internally integrated in the hardware accelerator 100 and/or external to the hardware accelerator 100 and accessible via one or more high-speed memory interfaces of the I/O interface 210, typically a dedicated interface for accessing local memory 216.

The event-driven circuits 102 may be adapted to perform one or more tasks and may generate (trigger) indications of events relating to the tasks to inform one or more other components in the computing system 200 that intervention is required to handle the events and process data relating to the events, specifically events which may require processing functionality of the hardware accelerator 100.

For example, the event-driven circuits 102 may include one or more network controllers, for example, Network Interface Controller (NIC), connected to one or more networks and/or links, for example, Ethernet, InfiniBand, and/or the like to support communication between one or more components in the computing system 200 and one or more remote devices, systems, platforms, and/or the like. In such case, the network controller event-driven circuit 102 may generate one or more triggers, for example, in response to reception of network packet(s) which need to be processed by the hardware accelerator 100, for example, packet (traffic) management, routing, and/or the like.

In another example, the event-driven circuits 102 may include one or more storage controllers connected to one or more storage media devices, for example, a hard drive, a Network Attached Storage (NAS), a storage service, and/or the like. In such case, the storage controller event-driven circuit 102 may generate one or more triggers, for example, in response to loading, from the storage media into memory, data segments which need to be processed by the hardware accelerator 100, for example, decryption, decoding, and/or the like.

In another example, the event-driven circuits 102 may include one or more sensor controllers connected to one or more sensors, for example, imaging sensor, typically high throughput sensors, such as, camera, SONAR, RADAR, and/or the like. In such case, the sensor controller event-driven circuit 102 may generate one or more triggers, for example, in response to receiving from the sensor(s) streaming sensory data which needs to be processed by the hardware accelerator 100, for example, analyzed, encoded, decoded, encrypted, and/or the like.

The event-driven circuits 102 may apply one or more trigger mechanisms, as known in the art.

For example, the event-driven circuits 102 may assert one or more interrupt lines electrically coupled to the hardware accelerator 100, specifically to an event handling circuit 212 of the hardware accelerator 100 adapted to detect the asserted interrupt line indicative of one or more events and initiate one or more operations accordingly.

In another example, the event-driven circuits 102 may access, for example, read, and/or write one or more shared memory locations, also known as semaphores in the art, which are monitored by the hardware accelerator 100, specifically by the event handling circuit 212 adapted to detect the access indicative of one or more events and initiate one or more operations accordingly. One or more such semaphores may be implemented, for example, using one or more shared memory locations in the local memory 216. In another example, one or more semaphores may be implemented via one or more shared access registers of the hardware accelerator 100, for example, one or more registers of the event handling circuit 212.

The computing system 200 may include one or more memory arrays, designated system memory 204, specifically high-speed random access memory, volatile and/or persistent, for storing data and/or software code instructions (program store) may be accessible to the host processor 202, the hardware accelerator 100 and/or the event-driven circuit(s) 102.

It should be noted that the computing system 200 is exemplary only and is described to include components relevant to embodiments disclosed herein. This, however, should not be construed as limiting, since the computing system 200 may include one or more additional components, devices, elements and/or the like as known in the art.

The host processor 202, the hardware accelerator 100 and the event-driven circuit(s) 102 may communicate with each other and optionally access the system memory 204 via one or more interconnections, channels, busses, links, and/or the like, as known in the art, designated bus 206 hereinafter, for example, system bus, memory bus, Peripheral Component Interconnect (PCI), PCI Express (PCIe), InfiniBand, and/or the like.

The I/O interface 210 may therefore include one or more interfaces, ports, links and/or the like for connecting to the bus 206, for example, a PCIe interface, a system bus interface, and/or the like.

The bus 206 connecting the elements of the computing system 200 may employ one or more bus and interconnect architectures, as known in the art, which may be serial, parallel and/or a combination thereof, point-to-point, and/or multi-drop, for electrically and communicatively coupling the host processor 202, the hardware accelerator 200, the event-driven circuit(s) 102 and the system memory 204.

For example, the host processor 202 may connect to the hardware accelerator 200 and to the system memory 204 via two separate and independent interfaces. In another example, a common bus may connect the host processor 202 and the hardware accelerator 200 to the system memory 204. Moreover, one or more controllers, bridges, and/or gateways may be deployed, as known in the art, to support connection between segments of the bus 206 and relay data and traffic between the different interconnections, channels, busses, and/or links.

Moreover, the computing system 200 may employ one or more designs, architectures, deployments and/or implantations.

For example, the computing system 200 may be a board level system (Printed Circuit Board (PCB)) comprising a plurality of Integrated Circuits (IC), components and/or circuits. In such deployment, the host processor 202, the hardware accelerator 100, the event driven device(s) 102, the memory 204, and/or the like may be each implemented by a respective IC. In such case, the bus 206 may comprise one or more buses and/or interconnections, for example, PCIe, memory bus, system bus, and/or the like.

In another example, the computing system 200 may be implemented by a System on a Chip (SoC) integrating multiple functional modules of the computing system 200, for example, the host processor 202, the hardware accelerator 100, the event driven device(s) 102, the memory 204, as well as other logic modules on a single chip, i.e., component, IC, and/or the like. Each of the functional modules may be implemented via one or more technologies, for example, logic module, hard core, soft core, IP core, IP block, and/or the like. In such case, the bus 206 may comprise one or more interconnections internal in the SoC implemented, for example, via internal logic, resources, and/or infrastructure of the SoC to connect between the functional modules of the SoC. Furthermore, multiple functional modules, for example, the hardware accelerator 100 and one or more event driven devices 102 may be implemented in a single core, for example, hard core, soft core, IP core, and/or the like.

For brevity, the process 120 describes the hardware accelerator 100 processing a single event triggered by a single event-driven circuit 102 executing the process 110. This however, should not be construed as limiting since the hardware accelerator 100 may repeat, expand and/or scale the process 120 to process a plurality of events triggered, optionally simultaneously and/or in overlapping manner, by a single event-driven circuit 102 and/or by multiple event-driven circuits 102 each executing a process such as the process 110.

As shown at 112, responsive to an event, which may be in process and/or completed, at an event-driven circuit 102, the event-driven circuit 102 may access the local memory 216 associated with the hardware accelerator 100 to write context parameters relating to the respective event.

The context parameters may relate to the functionality of the event-driven circuit 102 and/or to a type of event at the event-driven circuit 102.

The context parameters relating to each event may be written to a certain memory segment, designated context memory segment, associated with the respective event which is allocated in the local memory 216 for storing the plurality of context parameters relating to the respective event.

For example, one or more context data structures may be created for each event originating from each event-driven circuit 102, for example, by a host processor such as the host processor 202, to serve for storing context parameters for processing data relating to the respective event. The context data structure associated with each event may be loaded into a respective context memory segment in the local memory 216. For example, the host processor 202 may create context data structures for one or more events in the system memory 204 and transfer the context data structures to respective context memory segments in the local memory 216. In another example, the host processor 202 may create context data structures for one or more events directly in respective context memory segments in the local memory 216.

Moreover, one or more context parameters relating to one or more events may be loaded in advance, i.e., offline, for example, by the host processor 202 into the context memory segment allocated for the respective event.

Optionally, the hardware accelerator 100 itself may allocate a respective context memory segment for one or more events and may optionally update one or more context parameters (context data) in the allocated context memory segment.

In real-time, responsive to an event, the event-driven circuit 102 may access the context memory segment allocated for the respective event in the local memory 216 to write context parameters relating to the respective event.

For example, assuming the hardware accelerator 100 is adapted to process, for example, manage, route, analyze, and/or the like, network packets, received via one or more sockets (network connections) of a network adapter (NIC) event-driven circuit 102. In particular, the hardware accelerator 100 may process the packets according to their type. In such case, a context data structure may be created for each network socket, for example, by the host processor 202, to serve for storing context parameters relating to packets received via the respective socket, for example, socket type (e.g., UDP. TCP, etc.), socket number, and/or the like.

Responsive to an event, for example, receiving one or more network packets, the NIC event-driven circuit 102 may access the local memory 216 to write one or more context parameters in the context data structure allocated for the packet(s) reception event. In such case, the context parameters may include, for example, the received network packet(s) and/or part thereof, for example, one or more packet headers, control and/or data fields (e.g., routing information, etc.), and/or the like. The context parameters may further include information relating to the received packet(s), for example, routing information (e.g., order, protocol, etc.), timing information (e.g., timestamp, etc.), statistics information, and/or the like.

In another example, assuming the hardware accelerator 100 is adapted to process data stored in one or more storage media devices (e.g., hard drive) controlled by a storage (controller) event-driven circuit 102. In particular, the hardware accelerator 100 may process the packets according to their type. In such case, a context data structure may be created for each storage media device controlled by the storage event-driven circuit 102, for example, by the host processor 202, to serve for storing context parameters relating to the respective storage media device.

Responsive to an event, for example, completion of an I/O operation to a respective storage media device, the storage event-driven circuit 102 may access the local memory 216 to write one or more context parameters in the context data structure allocated for the I/O operation, for example, volume of data transferred in the I/O operation, completion conditions (success, fail, suspend, etc.), source/destination sector, and/or the like.

As shown at 114, the event-driven circuits 102 may trigger an event trigger indicative of the event relating to the event-driven circuits 102.

As described herein before, the event-driven circuits 102 may employ one or more triggering mechanisms to trigger the hardware accelerator 100, specifically the event handling circuit 212 of the hardware accelerator 100.

For example, the event-driven circuits 102 may be configured to assert one or more interrupt lines connecting the event-driven circuits 102 to the hardware accelerator 100. In another example, the event-driven circuits 102 may be configured to access one or more semaphores, for example, a memory cell in the local memory 216, and/or a register in the hardware accelerator 100, which are monitored by the hardware accelerator 100, for example, by the event handling circuit 212 and/or by one or more other circuits, modules, and/or components of the hardware accelerator 100 which are in communication with the event handling circuit 212.

As shown at 122, the process 120 starts with hardware accelerator 100, specifically the event handling circuit 212 detecting the event trigger activated (triggered) by the event-driven circuit 102.

Obviously, the event handling circuit 212 may be adapted to one or more of the triggering mechanism(s) employed and/or supported by the event-driven circuits 102. For example, assuming the event-driven circuit 102 asserts an interrupt line connected to the hardware accelerator 100, in response to detecting assertion, and/or activation of the interrupt line, the event handling circuit 212 may be invoked, interrupted, and/or informed of the event trigger. In another example, assuming the event-driven circuit 102 accesses one or more semaphores monitored by the event handling circuit 212, the access to the monitored semaphore(s) may invoke, interrupt, and/or inform the event handling circuit 212 of the event trigger.

As shown at 124, the hardware accelerator 100, for example, the event handling circuit 212 may update one or more pointers to point to an event handling routine in the local memory 216 for handling the respective triggered even and to the context memory segment allocated in the local memory 216 which stores the plurality of context parameters relating to the respective event.

One or more methods, techniques and/or implementations may be applied for loading the event handling routines into the local memory 216, each to a respective location in the local memory 216.

For example, one or more event handling routines may be preloaded into the local memory 216 in advance, i.e., offline, for example, by the host processor 202. For example, during a boot sequence, an initialization procedure, and/or the like, the host processor 202 may upload one or more of the event handling routines relating to events handled by the hardware accelerator 100 into the local memory 216.

In another example, one or more event handling routines may be stored in one or more persistent memory arrays (e.g., ROM, Flash, NVRAM, etc.) attached to the hardware accelerator 100 and loaded into the local memory 216 during a boot sequence, an initialization procedure, and/or the like.

In another example, the local memory 216 may include one or more persistent memory arrays which may be programmed and/or hard coded to store one or more event handling routines, for example, during production, during deployment, during power-up, and/or the like.

The event handling circuit 212 may apply one or more techniques, and/or methods as known in the art for retrieving the pointers of the event handling routine and the context memory segment associated with the respective event.

For example, when triggering the event, the event-driven circuit 102 may transfer an event identifier (ID) to the event handling circuit 212, for example, write the event ID to the semaphore, update the event ID in a predefined memory/register location, and/or the like.

One or more records, for example, a table, a list, a file, and/or the like, stored for example, in the local memory 216, may map each event (e.g., event ID) to a pointer pointing to a respective event handling routine and to a respective context memory segment associated with the respective event.

Using the event (ID) received from the event-driven circuit 102, the event handling circuit 212 may therefore access the pointes mapping record(s) to retrieve the pointer pointing to the respective event handling routine and to the respective context memory segment associated with the triggered event.

In another example, the event-driven circuit 102 may be updated in advance, for example, by the host processor 202 with pointers pointing to the event handling routine and the context memory segment associated with each event originating from the event-driven circuit 102. As such, when triggering the event, the event-driven circuit 102 may transfer the pointers (themselves) to the respective event handling circuit 212 and/or to respective context memory segment, for example, write the pointers to the semaphore, write the pointers in predefined memory/register location(s), and/or the like.

The event handling circuit 212 may therefore update the pointers, for example, register(s), software variable(s), and/or the like to indicate the pointer(s) fetched from the record(s) and/or received from the event handling circuit 212 such that the updated pointers may point to the respective event handling routine and to the respective context memory segment associated with the respective event.

The event handling circuit 212 may further transmit the updated pointers to the hardware acceleration engine 214. For example, the event handling circuit 212 may store the updated pointers in one or more register(s) accessible to the hardware acceleration engine 214. In another example, the event handling circuit 212 may transfer the updated pointers to the hardware acceleration engine 214 via one or more software variables defined in a code executed by the hardware accelerator 100.

As shown at 126, which is an optional step, the hardware accelerator 100, for example, the event handling circuit 212 may optionally allocate processing resources of the hardware accelerator 100 for processing data relating to the respective triggered event.

The processing resources of the hardware accelerator 100 may comprise software based resources, such as, for example, memory ranges, thread IDs, and/or the like and/or) or hardware based resources such as, for example, execution pipelines, computing cores, threads, function specific hardware units (e.g., multipliers, FFT units, convolution units, etc.), memory arrays (e.g., RAM, FIFO, etc.), queues, bus requests, and/or the like.

Moreover, the hardware accelerator 100 may employ dataflow architecture having one or more interconnected computation grids which comprises a plurality of reconfigurable logic elements and support memory units which may be dynamically connected in runtime via a plurality of configurable data routing junctions.

The event handling circuit 212 may therefore allocate hardware resources of the hardware accelerator 100, for example, grid elements, FFT units, multipliers and/or the like for processing the data relating to the triggered event. In particular, the event handling circuit 212 may allocate hardware resources according to the type of the triggered event.

For example, the event handling circuit 212 may allocate increased hardware resources for one or more computing intensive tasks invoked to process data relating to a first triggered event while allocating decreased hardware resources to support one or more light weight tasks invoked to process data relating to a second event. In another example, the event handling circuit 212 may allocate increased hardware resources for one or more computing tasks invoked to process data relating to a critical event requiring fast execution and/or low latency while allocating decreased hardware resources to support one or more tasks invoked for handling a non-critical event which is not subject to strict latency constraints.

Optionally, the processing resources allocated to the hardware acceleration engine 214 for processing the event, may be allocated in an atomic fashion to ensure that each resource is allocated for processing a single event at a time until completion of the event and complementary, that the processing resources allocated for processing each event are reserved for the duration of handling this event. Once the event completed, i.e., was handled, the processing resources allocated for processing this event may be released.

As shown at 128, hardware accelerator 100, specifically the hardware acceleration engine 214 may process data relating to the triggered event.

In particular, the hardware acceleration engine 214 may use the updated pointers to load and execute the event handling routine in order to process data relating to the event according to at least some of the context parameters retrieved from the context memory segment using the updated pointers.

The hardware acceleration engine 214 may therefore typically process the data relating to the event with no intervention of the host processor 202 thus eliminating the need for the host processor 202 to perform a context switch in order to handle the event and operate the hardware acceleration engine 214 to process the data relating to the event accordingly.

For example, assuming the hardware acceleration engine 214 is adapted to handle network packets received via one or more networks by a NIC event-driven circuit 102. In such case, an exemplary event handling routine associated with an incoming network packet event may be adapted to cause the hardware acceleration engine 214 to process the incoming packets according to at least some respective context parameters retrieved from the respective context memory segment. For example, the hardware acceleration engine 214 may assist expedited routing of a packet by computing a hash value based on context parameters, for example, source and destination IP addresses and ports (a.k.a. packet's 4-tuple) extracted from the packet, which may be matched against hash values in one or more routing tables as known in the art.

In another example, assuming the hardware acceleration engine 214 is adapted to process data stored in one or more storage media devices controlled by a storage controller event-driven circuit 102. In such case, an exemplary event handling routine associated with an I/O event for loading data from a storage media device may be adapted to cause the hardware acceleration engine 214 to decode an encoded data block loaded from the storage media device into the local memory 216, for example, into a context memory segment associated with the I/O event. In another example, the event handling routine associated with an I/O event may be further adapted to cause the hardware acceleration engine 214 to compute a hash value for the loaded block and compare it with a reference hash value, loaded as a context parameter by the storage controller event-driven circuit 102, to verify integrity of the loaded data block.

As shown at 130, the hardware accelerator 100, for example, the hardware acceleration engine 214 may complete processing the event.

For example, the hardware acceleration engine 214 may generate one or more notifications (e.g., assert line, transmit message, etc.) notifying one or more devices, and/or modules, for example, the event-driven circuit 102, the host processor 202, and/or the like that it completed processing data relating to the current event.

Moreover, the hardware acceleration engine 214 may further release one or more hardware resources allocated for its processing of data relating to the present event. For example, continuing the network packets processing hardware acceleration engine 214 example, upon completion of processing the packet, the hardware acceleration engine 214 may release the memory (buffer) allocated for the processed packet making it available for reuse for storing another packet. In another example, continuing the stored data processing hardware acceleration engine 214 example, upon completion of processing a respective data block, the hardware acceleration engine 214 may release the memory allocated for storing the encoded data block to be reused for storing another data block.

Figure 3:
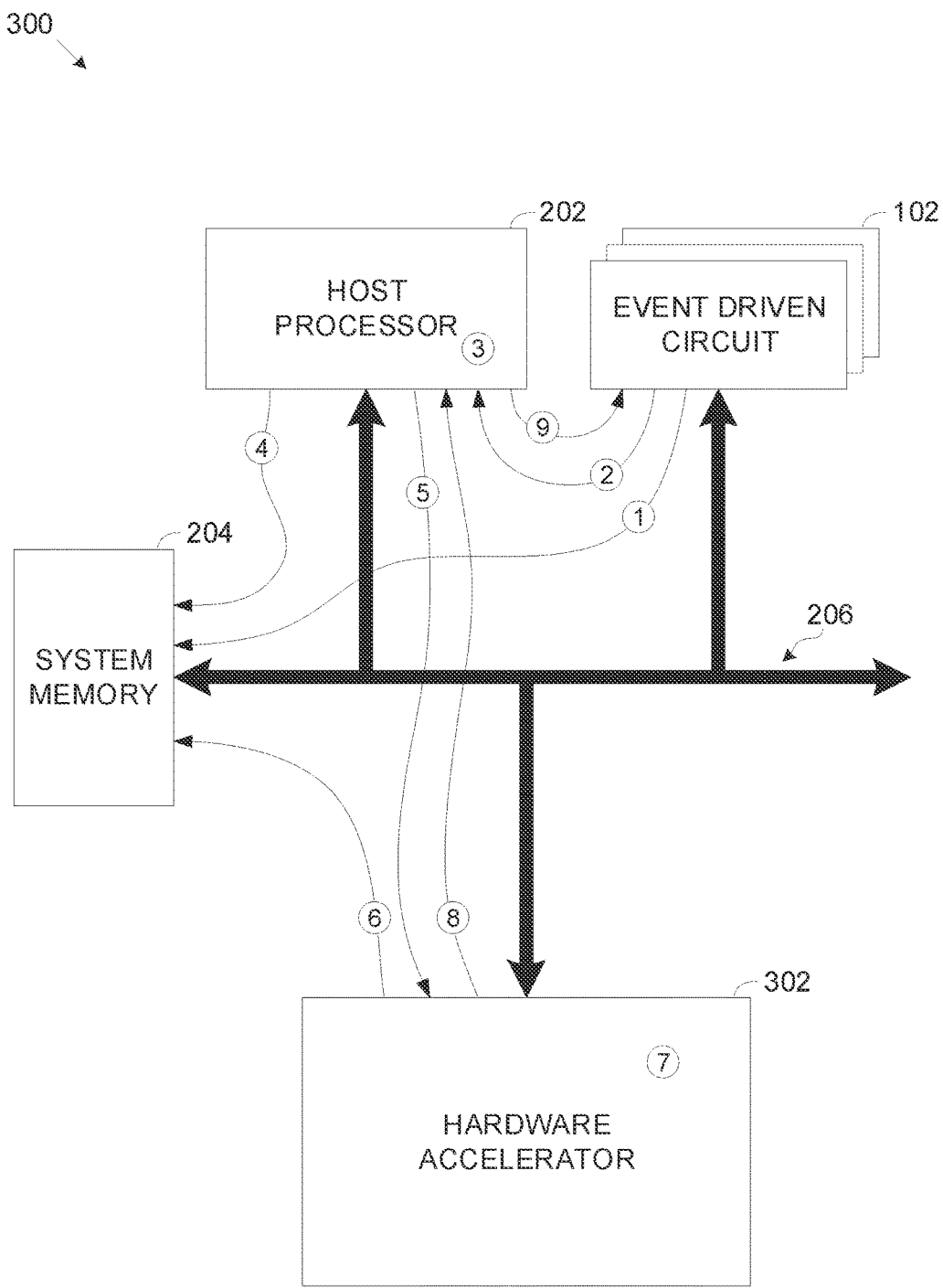
FIG. 3 is a schematic illustration of an exemplary sequence for handling events triggered by event-driven units.
Figure 4:
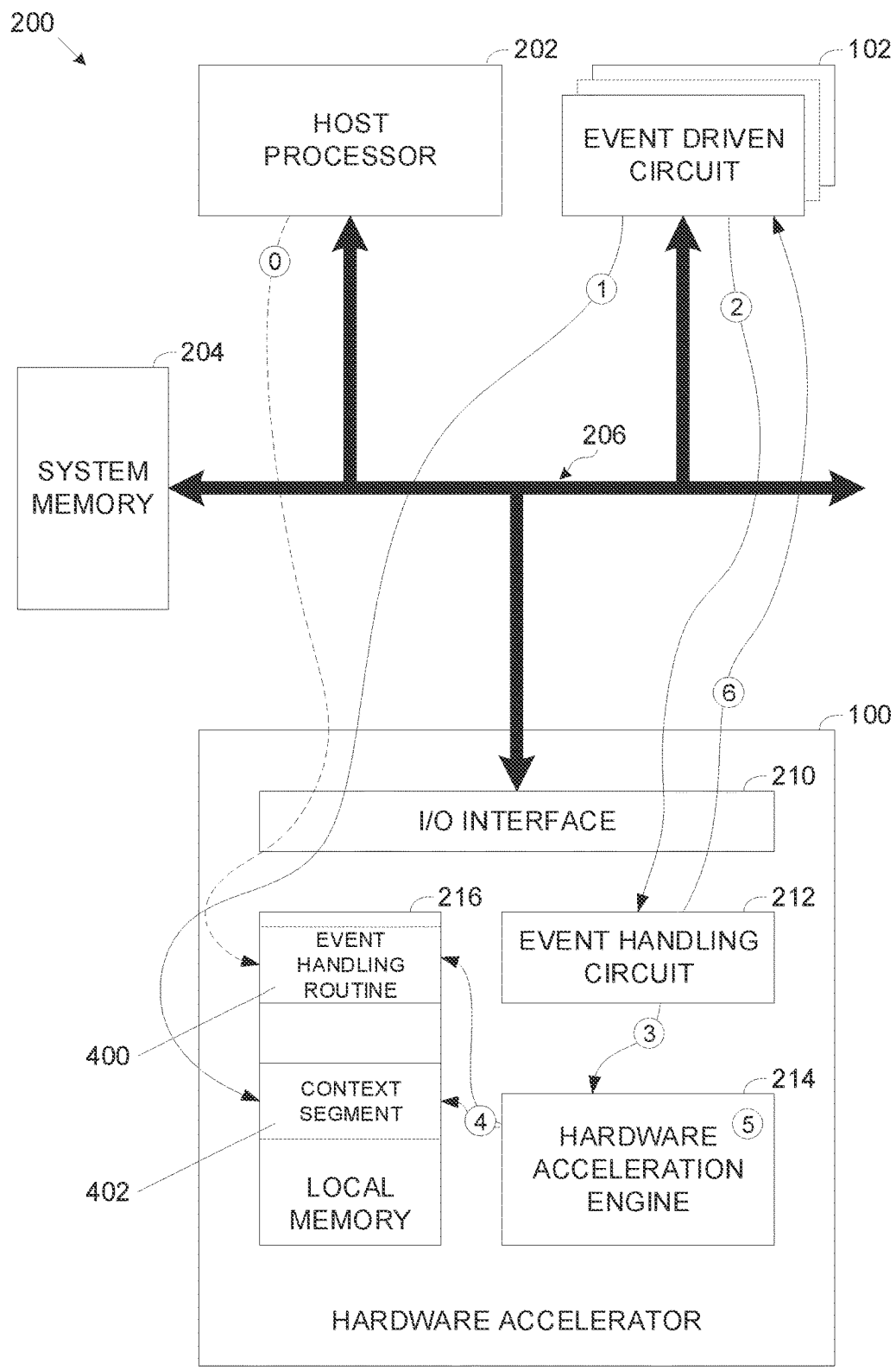
FIG. 4 is a schematic illustration of an exemplary sequence for handling events triggered by event-driven units by a hardware accelerator adapted to process data relating to the triggered events, according to some embodiments of the present invention.

Reference is now made to FIG. 3, which is a schematic illustration of an exemplary sequence for handling events triggered by event-driven units as may be done by existing methods, systems, and/or computing environments. Reference is also made to FIG. 4, which is a schematic illustration of an exemplary sequence for handling events triggered by event-driven units by a hardware accelerator adapted to process data relating to the triggered events, according to some embodiments of the present invention.

As seen in FIG. 3, an exemplary computing system 300 portraying a typical legacy computing system may comprise a host processor such as the host processor 202, one or more event-driven circuits such as the event-driven circuit 102, a hardware accelerator 302, and a system memory such as the system memory 204 connected with each other via a bus such as the bus 206.

A sequence of handling an event triggered by one of the event-driven circuit 102 in the computing system 300 may comprise the following steps:

(1) Responsive to an event, the event-driven circuit 102 writes data, relating to the event and needs to be processed, into the system memory 204 shared and accessible by components in the computing system 300.

Optionally, the event-driven circuit 102 may further write in the system memory 204 one or more context parameters relating to the event.

(2) The event-driven circuit 102 triggers (activates) an event trigger to inform the host processor 202 of the event.

(3) The host processor 202 which currently executes another task (routine, application, thread, etc.) performs a context switch to execute the event handling routine associated with the event.

(4) The host processor 202 may optionally access the system memory 204 to fetch context parameters relating to the triggered event.

(5) The host processor 202 triggers the hardware accelerator 300 to start processing the data relating to the event.

(6) The hardware accelerator 300 reads from the system memory 204 the data previously written by the event-driven circuit 102 which relates to the event.

(7) The hardware accelerator 300 processes the data relating to the event. While processing the data, the hardware accelerator 300 may optionally need to further read and/or write data to the system memory 204.

(8) Upon processing completion, the hardware accelerator 300 notifies the host processor 202 that processing of data relating to the event is done.

(9) The host processor 202 notifies the event-driven circuit 102 that processing of data relating to the event is done.

As seen in FIG. 4, an exemplary computing system such as the computing system 200 may comprise a host processor 202, one or more event-driven circuits 102, a hardware accelerator such as the hardware accelerator 100, and a system memory 204 connected with each other via a bus 206.

A sequence of handling an event triggered by one of the event-driven circuit 102 in the computing system 300 may comprise the following steps:

(0) The host processor 202 prepares and loads a set of instructions, specifically one or more event handling routines 400 in a local memory such as the local memory 216 of the hardware accelerator 100.

As described herein before, this operation may be done offline before any events are triggered, for example, during a boot sequence, during initialization, and/or the like.

As also described herein before, other architectures, implementations and/or designs as known in the art may be applied for loading the event handling routine(s) 400 into the local memory 216, for example, hard coding, using persistent memory attached to the hardware accelerator 100, and/or the like.

(1) Responsive to an event, the event-driven circuit 102 writes into the local memory 216 data and/or context parameters relating to the event. For example, the event-driven circuit 102 may write the and/or context parameters into a context memory segment 402 allocated in the local memory 216 for the event.

(2) The event-driven circuit 102 triggers (activates) an event trigger to inform the hardware accelerator 100 of the event. In particular, the event may be detected by an event handling circuit of the hardware accelerator 100 such as the event handling circuit 212.

(3) The event handling circuit 212 updates pointers according to the detected event to point to the respective event handling routine 400 and the respective context memory segment 402 associated with the detected event.

The event handling circuit 212 further transmits the updated pointers to a hardware acceleration engine 214 of the hardware accelerator 100.

(4) The hardware acceleration engine 214 uses the updated pointer to access the event handling routine 400 and context parameters stored in context memory segment 402.

(5) The hardware acceleration engine 214 executes the event handling routine 400 to process data relating to the event according to retrieved context parameters.

(6) Upon processing completion, the event handling circuit 212 notifies the event-driven circuit 102 that processing of data relating to the event is done.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms hardware accelerators, processor architecture, events, and trigger mechanism are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A hardware acceleration circuit coupled to a host processor, comprising:
    a communication interface for connecting to at least one event-driven circuit;
    a memory;
    a hardware acceleration engine; and
    an event handling circuit configured to:
        autonomously detect at least one event triggered by the at least one event-driven circuit and independent of an execution of a currently executed routine by the host processor,
        in response to the detected at least one event, update at least one pointer pointing to at least one event handling routine stored in the memory and to a context memory segment in the memory storing a plurality of context parameters relating to the at least one event, and
        directly transmit the at least one pointer to the hardware acceleration engine without intervention of the host processor in the pointer transmission;
    wherein the hardware acceleration engine is configured to:
        receive the at least one pointer from the event handling circuit, and
        execute the at least one event handling routine pointed by the at least one pointer to process data relating to the at least one event according to at least some of the plurality of context parameters retrieved from the context memory segment using the at least one pointer;
    wherein the hardware acceleration circuit processes the at least one event without requiring the host processor to perform a context switch from the currently executed routine to the at least one event handling routine.

2. The hardware acceleration circuit of claim 1, wherein the hardware acceleration engine is adapted to process the at least one event with no intervention of a host processor.

3. The hardware acceleration circuit of claim 1, wherein the event handling circuit is further adapted to allocate at least one hardware resource to support processing of the data relating to the at least one event.

4. The hardware acceleration circuit of claim 1, wherein the at least one event handling routine is preloaded into the memory by at least one host processor.

5. The hardware acceleration circuit of claim 1, wherein the at least one event handling routine is hard coded in the memory.

6. The hardware acceleration circuit of claim 1, wherein at least one of the plurality of context parameters is updated in the context memory segment by the at least one event-driven circuit.

7. The hardware acceleration circuit of claim 1, wherein at least one of the plurality of context parameters is updated in the context memory segment by at least one host processor.

8. The hardware acceleration circuit of claim 1, wherein the at least one event handling routine and the plurality of context parameters are pre-loaded into the memory before the at least one event is detected.

9. The hardware acceleration circuit of claim 1, wherein the event handling circuit is further configured to allocate hardware resources of the hardware acceleration engine based on a type of the at least one event.

10. The hardware acceleration circuit of claim 1, wherein the memory comprises a local memory that is separate from a system memory accessible to the host processor, and wherein the event handling routines and the plurality of context parameters are stored in the local memory.

11. The hardware acceleration circuit of claim 1, wherein the event handling circuit is configured to detect the at least one event through hardware trigger mechanisms including at least one of: interrupt line assertion by the at least one event-driven circuit, or monitored memory location access by the at least one event-driven circuit.

12. The hardware acceleration circuit of claim 1, wherein the event handling circuit is further configured to allocate hardware resources of the hardware acceleration engine based on a type of the detected at least one event, wherein different types of events receive different amounts of allocated hardware resources.

13. The hardware acceleration circuit of claim 1, wherein the at least one event handling routine is pre-loaded into the memory prior to detection of the at least one event by the host processor during at least one of: a boot sequence or an initialization process.

14. The hardware acceleration circuit of claim 1, wherein the at least one event-driven circuit is configured to write the plurality of context parameters directly to the context memory segment without host processor intervention.

15. A method of accelerating event processing coupled to a host processor, comprising:
    using an event handling circuit for:
        autonomously detecting at least one event independent of an execution of a currently executed routine by the host processor and triggered by at least one event-driven circuit,
        in response to the detected at least one event, updating at least one pointer pointing to at least one event handling routine stored in a memory and to a context memory segment in the memory storing a plurality of context parameters relating to the at least one event; and
        directly transmit the at least one pointer to a hardware acceleration engine without intervention of the host processor in the pointer transmission;
    using a hardware acceleration engine for:
        receive the at least one pointer from the event handling circuit, and
        executing the at least one event handling routine pointed by the at least one pointer to process data relating to the at least one event according to at least some of the plurality of context parameters retrieved from the context memory segment using the at least one pointer;

wherein the hardware acceleration circuit processes the at least one event without requiring the host processor to perform a context switch from the currently executed routine to the at least one event handling routine.

16. The method of claim 15, wherein the hardware acceleration engine is adapted to process the at least one event with no intervention of a host processor.

17. The method of claim 15, wherein the event handling circuit is further adapted to allocate at least one hardware resource to support processing of the data relating to the at least one event.

18. The method of claim 15, wherein the at least one event handling routine is preloaded into the memory by at least one host processor.

19. The method of claim 15, wherein the at least one event handling routine is hard coded in the memory.

20. The method of claim 15, wherein at least one of the plurality of context parameters is updated in the context memory segment by the at least one event-driven circuit.

21. The method of claim 15, wherein at least one of the plurality of context parameters is updated in the context memory segment by at least one host processor.

22. The hardware acceleration circuit of claim 10, wherein data relating to the at least one event is transferred only once over a system bus connecting the hardware acceleration circuit to the system memory, eliminating a need for double transfer of the data.

* * * * *